3,053,879
MANUFACTURE OF TRIMETHYL PHOSPHATE
Gerald W. Kottong, Baton Rouge, La., assignor to Ethyl Corporation, New York, N.Y., a corporation of Delaware
No Drawing. Filed Aug. 20, 1959, Ser. No. 834,962
6 Claims. (Cl. 260—461)

This invention relates to the production of trimethyl phosphate and especially to an improved process for large scale commercial manufacture thereof.

Many alkyl and aryl phosphate esters are presently produced on commercial scale and are extensively used both as additives to gasoline and as plasticizers for thermoplastics. The simplest of the organo phosphate esters, trimethyl phosphate, is not manufactured at the present time even though it is a highly effective gasoline additive (U.S. 2,427,173) and even though it would be much cheaper than the phosphate esters presently in use. Its economy is based upon its high phosphorus content (22 percent of trimethyl phosphate) whereas with tricresyl phosphate, for example, the phosphorus content is only about 12 percent. The major deterrent in the use of trimethyl phosphate has been the lack of an adequate process to economically produce the same. By all known processes the yields of trimethyl phosphate have been of the order of 20–40 percent. Among the many reasons for poor yields includes the formation of by-product methyl chloride and acids, even at temperatures as low as −70° C.

It is accordingly an object of this invention to provide an improved process for the manufacture of trimethyl phosphate. Still another object is to provide a process which is suitable for use on commercial scale to give high yields, i.e., above about 85 percent of trimethyl phosphate, and which at the same time avoids the formation of undesired by-products. Another object is to provide a process in which the product can be simply and easily recovered by distillation without the need for neutralization of the by-product hydrogen chloride. Still another object is to provide a process which can be integrated with a methyl chloride or ethyl chloride process, thereby permitting the economic and efficient utilization of by-product hydrogen chloride without costly separation steps.

It has now been found that exceptional yields of trimethyl phosphate can be obtained if a reaction zone is established in which methanol and phosphorus oxychloride are continuously fed to the zone under reaction conditions, the methanol being fed in at least 30 percent excess based on stoichiometry, simultaneously feeding an inert gas, such as ethylene, to the reaction zone to provide countercurrent or crossflow stripping of the hydrogen chloride, the quantity of the gas added being from about 4 to 8 moles per mole of hydrogen chloride produced as a by-product, the by-product hydrogen chloride and gas being removed from the top of the zone and the product trimethyl phosphate being recovered at the bottom of the reaction zone. An external heat exchanger can be employed to remove the heat of reaction or alternately a sufficient quantity of liquid alkyl chloride (methyl chloride or ethyl chloride) can be added to the reaction mixture to remove by vaporization the heat of reaction and the heat of solution of the hydrogen chloride in the reaction mixture. When internal cooling is employed, from 3 to 4 moles of alkyl chloride are used per mole of hydrogen chloride produced (9 to 12 moles per mole of phosphorus oxychloride). To reduce the cooling load in the reactor, it is frequently desirable to pre-saturate the methanol with hydrogen chloride before feeding to the reactor. If desired, a reflux condenser can be provided at the top of the reactor to continuously return the liquid alkyl chloride to the reactor for cooling the reaction mass. The phosphorus oxychloride/methanol mole ratio is preferably between about 1:3.9–1:8. The residence time in the reaction zone should not be greater than about one hour and preferably the residence time is maintained between 10 minutes and 30 minutes. The temperature of the reaction can range from about 0 to 50° C., although it is preferred to maintain the temperature from 10 to 30° C. The pressure of the reaction is maintained from atmospheric to about 100 p.s.i.g. Higher pressure can be used if desired.

The reaction zone is best separated into stages, usually from 3 to 20 stages, in order to permit high yields of the desired trimethyl phosphate without the formation of other phosphorus-containing by-products. Best results are obtained with from 4 to 10 stages. In some instances, it is desirable to employ a packed reactor using the common packing materials such as Rashig rings and the like. The trimethyl phosphate removed from the bottom of the vertical reaction zone can be distilled to recover the trimethyl phosphate in high purity, usually from 95 to 100 percent.

The following are typical examples which illustrate the process of this invention. The examples of Table I were carried out in a vertical column having 5 plates. The methanol and phosphorus oxychloride were fed on the top plate and the ethylene on the bottom plate. The reaction mixture was maintained at about 20° C. All quantities are given in moles.

|  | Examples | | | | | | | |
|---|---|---|---|---|---|---|---|---|
|  | I | II | III | IV | V | VI | VII | VIII |
| Feed (moles): | | | | | | | | |
| POCl₃ | 0.3928 | 0.3273 | 0.3382 | 0.3600 | 0.3600 | 0.3928 | 0.5674 | 1.0 |
| MeOH | 1.8750 | 1.6750 | 1.7250 | 1.9250 | 1.4500 | 1.6000 | 2.9250 | 4.92 |
| C₂H₄ | 6.8100 | 4.8640 | 5.1790 | 4.6841 | 4.6120 | 5.7395 | 5.8371 | 12.07 |
| Conversion, percent | 94.9 | 97.2 | 97.9 | 97.4 | 94.4 | 94.8 | 91.4 | 97.7 |
| TMP yield, percent | 86.4 | 85.4 | 85.3 | 85.8 | 83.1 | 79.5 | 74.1 | 88.3 |
| Residence time, minutes | 39.3 | 42.7 | 46.3 | 48.4 | 44.7 | 36.9 | 24.2 | 19.8 |
| Percent HCl removed | 68.1 | 60.3 | 62.5 | 62.4 | 75.2 | 74.4 | 53.0 | 72.9 |
| Cleavage, percent | 8.4 | 14.6 | 14.7 | 14.2 | 14.7 | 20.5 | 10.4 | 11.7 |
| Temperature, °C | 20 | 20 | 20 | 20 | 20 | 20 | 20 | 20 |
| MeCl (liquid) |  |  |  |  |  |  |  | 9.11 |
| Prod. dist., weight percent: | | | | | | | | |
| HCl | 15.24 | 17.75 | 17.85 | 15.59 | 13.78 | 13.72 | 18.70 | 14.0 |
| MeOH | 19.26 | 21.95 | 19.49 | 24.74 | 9.92 | 12.79 | 23.40 | 3.6 |
| POOH | 5.16 | 8.28 | 8.66 | 7.96 | 10.56 | 14.27 | 5.61 | 8.6 |
| Unreacted P-Cl bonds | 3.56 |  |  |  | 1.79 |  | 9.28 |  |
| TMP | 56.78 | 52.03 | 54.00 | 51.71 | 63.95 | 59.22 | 43.01 | 68.8 |
| MeCl |  |  |  |  |  |  |  | 5.0 |

Note.—Me=Methyl.

The above product was thereafter distilled in two successive columns to obtain pure trimethyl phosphate.

The first column was operated with an overhead temperature of about 38° F. and a bottoms temperature of 235° F. The overhead was primarily methanol and HCl. The bottoms were passed to a second column wherein the trimethyl phosphate was distilled at an overhead temperature of 190° F. and a bottoms temperature of 390° F.

*Example IX*

The process of this example has been carried out in separate staged stirred pot reactors, excellent results being obtained with three pots in series. The phosphorus oxychloride (1.5 moles per hour) was fed to the first reactor along with 7.5 moles per hour of methanol. The reaction mixture was removed near the bottom of the first reactor and fed to the second reactor near its top. Likewise, the reaction mixture from the second reactor is removed from the bottom thereof and fed to the third reactor near the top thereof. Each of the reactors was maintained by cooling coils at a temperature of 20° C. The residence time in the first reactor was 10 minutes, the second and third reactors 30 minutes. To each of the reactors was fed 12 moles per hour of nitrogen gas in order to provide crossflow stripping of the hydrogen chloride formed in the reaction. The mixed hydrogen chloride-nitrogen gas stream was removed from the top of each of the stirred reactors. The trimethyl phosphate reaction mixture was passed from the third reactor to a distillation column operated at an overhead temperature of 0° C. and bottoms temperature of 110° C., the pressure in the column being about 20 mm. of mercury. The purified trimethyl phosphate was thereafter removed from the bottom of the first column and fractionated in a second column operating at overhead temperature at the boiling point of the trimethyl phosphate; the column also is operated at a reduced pressure, i.e., about 20 mm. of mercury. The acids formed in the reaction were removed as bottoms of the second column. The overhead from the first column was primarily methanol containing dissolved HCl. This overhead gas mixture was partially condensed and returned to the first reactor. The uncondensed HCl and traced quantities of methanol can be recovered or used in other processes. The average yield of distilled purified trimethyl phosphate after many hours of operation was 75 percent based upon phosphorus oxychloride charged to the first reactor.

When the above reaction is repeated using countercurrent stripping, i.e., passing the nitrogen gas from the third reactor through the second reactor and then through the first reactor, similar results are obtained. Also, when the nitrogen is replaced with other inert gases, such as natural gas containing predominantly methane or when using ethane or ethylene, similar results are obtained. If desired, a quantity of methyl chloride can be added to each of the stirred pot reactors in sufficient quantities to effect internal cooling of the reaction to give similar results without use of the cooling coils.

A very effective and efficient manner of carrying out the process of this invention is to integrate the step of forming the trimethyl phosphate with a process of manufacturing ethyl chloride. Thus, the hydrogen chloride formed in the reaction together with the ethylene and, when present, alkyl chloride can be passed directly to the ethyl chloride plant without pre-separation of the alkyl chloride from the by-product hydrogen chloride.

The overhead containing hydrogen chloride and ethylene are passed to a reactor containing aluminum chloride or other Friedel-Crafts catalyst dissolved in ethyl chloride solvent and the hydrogen chloride reacted therein with ethylene (U.S. 2,838,578). This reaction is suitably carried out at elevated temperatures and pressures, that is above about 30° C. and at a pressure over 2 atmospheres. It has been found that the highly desirable range of operating temperatures is between 30° C. and 200° C. and still more preferably between 40 and 80° C. Similarly, under these temperature conditions operating pressures between 2 to 30 atmospheres and preferably between 6 and 14 atmospheres are beneficial in carrying out this process.

I claim:

1. Process for the manufacture of trimethyl phosphate comprising establishing a reaction zone containing from about 3 to 20 stages, continuously feeding methanol, phosphorus oxychloride and an inert gas to said zone, said methanol being fed in at least 30 percent excess based on stoichiometry, said inert gas being employed in a quantity of from 4 to 8 moles per mole of hydrogen chloride formed in said reaction and, while maintaining the temperature of the reaction zone within a range of from about 10° C. to about 30° C.

2. The process of claim 1 wherein the reaction zone has from about 4 to about 10 stages.

3. The process of claim 1 wherein the phosphorus oxychloride:methanol ratio is from about 1:3.9 to about 1:8.

4. The process of claim 1 wherein the residence time within the reaction zone is from about 10 minutes to about 30 minutes.

5. A process for the manufacture of trimethyl phosphate comprising establishing a staged reaction zone having from about 4 to about 10 stages, maintaining a temperature of from about 10° C. to about 30° C. therein while continuously feeding methanol, phosphorus oxychloride and an inert gas to said zone, the methanol being fed into the reaction zone in an excess of at least 30 percent based on the stoichiometry, the phosphorus oxychloride being fed into the reaction zone at a phosphorus oxychloride:methanol ratio of from about 1:3.9 to about 1:8, the inert gas is employed in a quantity of from about 4 to about 8 moles per mole of hydrogen chloride formed in the reaction and is a gas selected from the group consisting of ethylene, methane, ethane and natural gas, while providing a residence time within the reaction zone of from about 10 to about 30 minutes.

6. Process for the manufacture of trimethyl phosphate comprising establishing a series of three staged reaction zones, continuously feeding phosphorus oxychloride and methanol to the first zone, said methanol being fed in at least 30 percent excess based on stoichiometry, while removing the reaction mixture from the first zone and feeding same to the second zone, and removing the reaction mixture from the second zone and feeding same into the third zone, the reaction zones being maintained at a temperature of about 20° C. while providing a residence time in the first zone of about 10 minutes and a residence time in the second and third zones of about 30 minutes, while feeding natural gas into each of the said zones to effect maximum removal of hydrogen chloride byproduct.

References Cited in the file of this patent

UNITED STATES PATENTS

| | | |
|---|---|---|
| 2,078,421 | Shuman | Apr. 13, 1934 |
| 2,636,048 | Toy | Apr. 21, 1953 |

OTHER REFERENCES

Gerrard: J. Chem. Soc. 1940, 1464–1469.
Orloff et al.: J. Am. Chem. Soc. 80, 734–739 (1958).